United States Patent
Sekimura et al.

(10) Patent No.: US 8,641,924 B2
(45) Date of Patent: Feb. 4, 2014

(54) LIQUID CRYSTAL POLYESTER RESIN COMPOSITION

(75) Inventors: Satoshi Sekimura, Tsukuba (JP); Hirokazu Matsui, Tsukuba (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 155 days.

(21) Appl. No.: 13/410,344

(22) Filed: Mar. 2, 2012

(65) Prior Publication Data

US 2012/0235092 A1 Sep. 20, 2012

(30) Foreign Application Priority Data

Mar. 16, 2011 (JP) ................... 2011-057998

(51) Int. Cl.
- *C09K 19/38* (2006.01)
- *C09K 19/52* (2006.01)
- *C09K 19/54* (2006.01)
- *C09K 19/06* (2006.01)

(52) U.S. Cl.
USPC ............... 252/299.01; 252/299.5; 252/299.6

(58) Field of Classification Search
USPC .......................................... 252/299.01, 299.5
See application file for complete search history.

(56) References Cited

U.S. PATENT DOCUMENTS

| | | | |
|---|---|---|---|
| 2010/0065777 A1* | 3/2010 | Murouchi et al. | 252/299.66 |
| 2011/0089371 A1* | 4/2011 | Murouchi et al. | 252/299.01 |
| 2011/0114883 A1* | 5/2011 | Murouchi et al. | 252/299.6 |

FOREIGN PATENT DOCUMENTS

JP 2008239950 10/2008

\* cited by examiner

*Primary Examiner* — Shean C Wu
(74) *Attorney, Agent, or Firm* — Panitch Schwarze Belisario & Nadel LLP

(57) ABSTRACT

An object is to provide a liquid crystal polyester resin composition capable of producing a molding in which the generation amount of particles is sufficiently reduced.
The present invention provides a liquid crystal polyester resin composition including (1) a liquid crystal polyester, and (2) a fiber-shaped filler having a fiber diameter of 5 to 15 μm and a number average fiber length of 30 to 200 μm, wherein the content of a fiber having a fiber length of more than 200 μm is 10% by mass or less based on 100% by mass of the amount of the fiber-shaped filler.

4 Claims, No Drawings

LIQUID CRYSTAL POLYESTER RESIN COMPOSITION

BACKGROUND OF THE INVENTION

1. Field of the Invention

The present invention relates to a liquid crystal polyester resin composition.

2. Description of Related Art

A liquid crystal polyester is applied as materials of electric and electronic parts and optical parts because of its satisfactory moldability, high heat resistance and strength, and excellent insulation properties.

Usually, a resin molding made of a liquid crystal polyester is often obtained by molding using a resin composition prepared by adding a reinforcing filler to a liquid crystal polyester so as to improve a mechanical strength. However, there was a problem that, when electric and electronic parts, and optical parts are produced from a resin molding containing such a reinforcing filler added therein, foreign particulate matters (particles) are likely to be generated on a surface of the parts. The generation of such particles may cause a decrease in yield of parts in the assembling step, and malfunction when the product is used.

With respect to the generation of particles, JP-A-2008-239950 discloses that the generation of particles on a surface of parts can be prevented by defining surface roughness of a liquid crystal polyester resin molding containing a fiber-shaped filler.

SUMMARY OF THE INVENTION

Electric and electronic parts, and optical parts produced from a resin molding are sometimes subjected to ultrasonic cleaning during the production process so as to remove stains adhered on a surface of the parts. Such stains are stains caused by stains (for example, organic substances) adhered to a mold used so as to produce a resin Molding. In particular, when parts are subjected to ultrasonic cleaning at a low frequency, it is impossible to sufficiently reduce the generation amount of particles in conventional parts produced from a resin molding. Therefore, it is desired to further reduce the generation amount of particle.

Under these circumstances, the present invention has been made and an object thereof is to provide a liquid crystal polyester resin composition capable of producing a molding in which the generation amount of particles is sufficiently reduced.

In order to solve the problems, the present invention is a liquid crystal polyester resin composition comprising: (1) a liquid crystal polyester, and (2) a fiber-shaped filler having a fiber diameter of 5 to 15 μm and a number average fiber length of 30 to 200 μm, wherein the content of a fiber having a fiber length of more than 200 μm is 10% by mass or less based on 100% by mass of the amount of the fiber-shaped filler.

According to the present invention, it is possible to provide a liquid crystal polyester resin composition capable of producing a molding in which the generation amount of particles is sufficiently reduced.

DETAILED DESCRIPTION OF PREFERRED EMBODIMENT

A liquid crystal polyester to be used in a liquid crystal polyester resin composition of the present invention (hereinafter simply referred to as "resin composition") is preferably a liquid crystal polyester which exhibits mesomorphism in a molten state, and is melted at a temperature of 450° C. or lower. The liquid crystal polyester is a liquid crystal polyester amide, a liquid crystal polyester ether, a liquid crystal polyester carbonate, or a liquid crystal polyester imide. The liquid crystal polyester is preferably a whole aromatic liquid crystal polyester in which only an aromatic compound is used as a raw monomer.

Typical examples of the liquid crystal polyester include (I) a liquid crystal polyester obtained by polymerizing (polycondensing) an aromatic hydroxycarboxylic acid, with an aromatic dicarboxylic acid, and at least one kind of a compound selected from the group consisting of an aromatic diol, an aromatic hydroxyamine and an aromatic diamine; (II) a liquid crystal polyester obtained by polymerizing plural kinds of aromatic hydroxycarboxylic acids; (III) a liquid crystal polyester obtained by polymerizing an aromatic dicarboxylic acid with at least one kind of a compound selected from the group consisting of an aromatic diol, an aromatic hydroxyamine and an aromatic diamine; and (IV) a liquid crystal polyester obtained by polymerizing a polyester such as polyethylene terephthalate with an aromatic hydroxycarboxylic acid. Herein, a part or all of an aromatic hydroxycarboxylic acid, an aromatic dicarboxylic acid, an aromatic diol, an aromatic hydroxyamine and an aromatic diamine may be changed, respectively independently, to a polymerizable derivative thereof.

Examples of the polymerizable derivative of the compound having a carboxyl group, such as an aromatic hydroxycarboxylic acid and an aromatic dicarboxylic acid include a derivative (ester) in which a carboxyl group is converted into an alkoxycarbonyl group or an aryloxycarbonyl group; a derivative (acid halide) in which a carboxyl group is converted into a haloformyl group, and a derivative (acid anhydride) in which a carboxyl group is converted into an acyloxycarbonyl group.

Examples of the polymerizable derivative of the compound having a hydroxyl group, such as an aromatic hydroxycarboxylic acid, an aromatic diol and an aromatic hydroxylamine include a derivative (acylate) in which a hydroxyl group is converted into an acyloxyl group by acylation.

Examples of the polymerizable derivative of the compound having an amino group, such as an aromatic hydroxylamine and an aromatic diamine include a derivative (acylate) in which an amino group is converted into an acylamino group by acylation.

The liquid crystal polyester preferably includes a repeating unit represented by the following general formula (1) (hereinafter referred to as a "repeating unit (1)"), and more preferably includes a repeating unit (1), a repeating unit represented by the following general formula (2) (hereinafter referred to as a "repeating unit (2)"), and a repeating unit represented by the following general formula (3) (hereinafter referred to as a "repeating unit (3)")

  (1)

  (2)

  (3)

  (4)

wherein $Ar^1$ is a phenylene group, a naphthylene group or a biphenylylene group; $Ar^2$ and $Ar^3$ each independently represents a phenylene group, a naphthylene group, a biphenylylene group, or a group represented by the general formula (4); X and Y each independently represents an oxygen atom or an imino group (—NH—); $Ar^4$ and $Ar^5$ each independently represents a phenylene group or a naphthylene group; Z is an oxygen atom, a sulfur atom, a carbonyl group, a sulfonyl group or an alkylidene group; one or more hydrogen atoms in $Ar^1$, $Ar^2$ or $Ar^3$ each independently may be substituted with a halogen atom, an alkyl group or an aryl group.

Examples of the halogen atom include a fluorine atom, a chlorine atom, a bromine atom and an iodine atom. Examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group, an n-nonyl group and n-decyl group, and the number of carbon atoms is preferably from 1 to 10. Examples of the aryl group include a phenyl group, an o-tolyl group, an m-tolyl group, a p-tolyl group, a 1-naphthyl group and a 2-naphthyl group, and the number of carbon atoms is preferably from 6 to 20.

When the hydrogen atom is substituted with these groups, the number thereof is preferably 2 or less, and more preferably 1, every group represented by $Ar^1$, $Ar^2$ or $Ar^3$, respectively, independently.

Examples of the alkylidene group include a methylene group, an ethylidene group, an isopropylidene group, an n-butylidene group and a 2-ethylhexylidene group, and the number of carbon atoms is preferably from 1 to 10.

The repeating unit (1) is a repeating unit derived from an aromatic hydroxycarboxylic acid. The repeating unit (1) is preferably a repeating unit derived from p-hydroxybenzoic acid ($Ar^1$ is a p-phenylene group), or a repeating unit derived from 6-hydroxy-2-naphthoic acid ($Ar^1$ is a 2,6-naphthylene group).

The repeating unit (2) is a repeating unit derived from an aromatic dicarboxylic acid. The repeating unit (2) is preferably a repeating unit derived from terephthalic acid ($Ar^2$ is a p-phenylene group), a repeating unit derived from isophthalic acid ($Ar^2$ is a m-phenylene group), a repeating unit derived from 2,6-naphthalenedicarboxylic acid ($Ar^2$ is a 2,6-naphthylene group), or a repeating unit derived from diphenylether-4,4'-dicarboxylic acid ($Ar^2$ is a diphenylether-4,4'-diyl group).

The repeating unit (3) is a repeating unit derived from an aromatic diol, an aromatic hydroxyl amine or an aromatic diamine. The repeating unit (3) is preferably a repeating unit derived from hydroquinone, p-aminophenol or p-phenylenediamine ($Ar^3$ is a p-phenylene group), or a repeating unit derived from 4,4'-dihydroxybiphenyl, 4-amino-4'-hydroxybiphenyl or 4,4'-diaminobiphenyl ($Ar^3$ is a 4,4'-biphenylylenegroup).

The content of the repeating unit (1) is preferably 30 units or more, more preferably 30 to 80 units, still more preferably 40 to 70 unit, and particularly preferably 45 to 65 units. The content of the repeating unit (2) is preferably 35 units or less, more preferably from 10 to 35 units, still more preferably from 15 to 30 units, and particularly preferably from 17.5 to 27.5 units. The content of the repeating unit (3) is preferably 35 units or less, more preferably from 10 to 35 units, still more preferably from 15 to 30 units, and particularly preferably from 17.5 to 27.5 units. As the content of the repeating unit (1) increases, melt fluidity, heat resistance, strength and rigidity of the liquid crystal polyester are likely to be improved. However, when the content is too large, melting temperature and melt viscosity are likely to increase and thus the temperature required to molding is likely to increase.

A ratio of the content of the repeating unit (2) to the content of the repeating unit (3) [content of the repeating unit (2)]/[content of the repeating unit (3)] is preferably from 0.9/1 to 1/0.9, more preferably from 0.95/1 to 1/0.95, and still more preferably from 0.98/1 to 1/0.98.

The liquid crystal polyester may include two or more kinds of repeating units (1) to (3), respectively independently. The liquid crystal polyester may include repeating units other than repeating units (1) to (3), and the content thereof is preferably 10 units or less, and more preferably 5 units or less, based on 100 units in total of the whole repeating unit contained the liquid crystal polyester.

From the viewpoint of the fact that melt viscosity of the liquid crystal polyester is likely to decrease, the liquid crystal polyester preferably includes, as the repeating unit (3), a repeating unit in which X and Y are respectively oxygen atoms, that is, a repeating unit derived from an aromatic diol, and more preferably includes, as the repeating unit (3), only a repeating unit in which X and Y are respectively oxygen atoms.

From the viewpoint of producing a high molecular weight liquid crystal polyester having high heat resistance as well as strength and rigidity with satisfactory operability, the liquid crystal polyester is preferably produced by a production method including (1) the step of melt-polymerizing a raw compound (monomer) to obtain a polymer (prepolymer) and (2) the step of subjecting the obtained prepolymer to solid phase polymerization. The melt polymerization may be performed in the presence of a catalyst, and examples of the catalyst include metal compounds such as magnesium acetate, stannous acetate, tetrabutyl titanate, lead acetate, sodium acetate, potassium acetate and antimony trioxide; and nitrogen-containing heterocyclic compounds such as 4-(dimethylamino)pyridine and 1-methylimidazole. Among these catalysts, nitrogen-containing heterocyclic compounds are preferable.

The flow initiation temperature of the liquid crystal polyester is preferably 250° C. or higher, more preferably from 250° C. to 350° C., and still more preferably from 260° C. to 330° C. As the flow initiation temperature increases, heat resistance, strength and rigidity are likely to be improved. When the flow initiation temperature is too high, melting temperature and melt viscosity are likely to increases and thus the temperature required to molding is likely to increase.

The flow initiation temperature is also called a flow temperature and means a temperature at which a melt viscosity becomes 4,800 Pa·s (48,000 poise) when a liquid crystal polyester is melted while heating at a heating rate of 4° C./min under a load of 9.8 MPa (100 kg/cm$^2$) and extruded through a nozzle having an inner diameter of 1 mm and a length of 10 mm using a capillary rheometer, and the flow initiation temperature serves as an index indicating a molecular weight of the liquid crystal polyester (see "Liquid Crystalline Polymer Synthesis, Molding, and Application" edited by Naoyuki Koide, page 95, published by CMC Publishing CO., LTD on Jun. 5, 1987).

The fiber-shaped filler to be used in the resin composition of the present invention is an inorganic fiber-shaped filler or an organic fiber-shaped filler. Examples of the inorganic fiber-shaped filler include glass fibers; carbon fibers such as a PAN-based carbon fiber and a pitch-based carbon fiber; ceramic fibers such as a silica fiber, an alumina fiber and a silica alumina fiber; metal fibers such as a stainless steel fiber; and whiskers such as a potassium titanate whisker, a barium titanate whisker, a wollastonite whisker, an aluminum borate whisker, a silicon nitride whisker and a silicon carbide whisker. Examples of the organic fiber-shaped filler include a polyester fiber and an aramid fiber. Among these fillers, glass fibers are preferable as the fiber-shaped filler from the viewpoint of (1) ease of availability of a fiber-shaped filler, and (2) abrasion load to be applied to a molding apparatus in case of molding a resin composition.

The fiber-shaped filler is preferably a fiber-shaped filler which is not subjected to a surface coating treatment, from the viewpoint of (1) suppressing the generation of a gas from a molding obtained from the resin composition of the present invention thereby improving chemical stability of the molding, and (2) suppressing a gas, generated from a molding in case of assembling electric and electronic instruments or optical instruments using the molding, from contaminating peripheral members. Examples of the surface coating treatment include a surface coating treatment with a coupling agent such as a silane coupling agent or a titanium coupling agent, and a surface coating treatment with various thermosetting resins and thermoplastic resins.

The fiber-shaped filler is a fiber-shaped filler in which a fiber diameter is from 5 to 15 μm, and preferably from 6 to 12 μm, a number average fiber length is from 30 to 200 μm, and preferably from 50 to 150 μm, and the content of a fiber having a fiber length of more than 200 is 10% by weight or less based on 100% by weight of the fiber-shaped filler, from the viewpoint of obtaining a molding in which the generation amount of particles is sufficiently reduced. The fiber diameter and fiber length mean a fiber diameter and a fiber length of the fiber-shaped filler contained in a resin composition.

The above-mentioned fiber diameter and fiber length are measured by the method including the following processes of (1) molding a resin composition into pellets, (2) asking the pellets at 600° C. or higher, (3) dispersing the incinerated substance in methanol, (4) spreading the dispersion on a slide glass, and taking micrographs, (5) directly reading a fiber diameter and a fiber length of a fiber-shaped filler from the micrographs, and (6) calculating an average value from the read values using a parameter of 400 or more.

The above-mentioned "content of a fiber having a fiber length of more than 200 μm" can be measured by the following method-1 or method-2. The method-1 is a method including the processes of (1-1) passing a fiber-shaped filler through a sieve having an opening size of 500 μm or more (1-2) further passing the fiber-shaped filler, passed through the sieve, through a sieve having an opening size of 200 μm, and (1-3) measuring a fiber length of the fiber-shaped filler passed through the sieve using the above method thereby determining the content of the fiber having a fiber length of more than 200 μm. The fiber-shaped filler according to the present invention can be obtained by appropriately repeating the process of the method-1. It is preferred that the sieves in the processes (1-1) and (1-2) are inclinedly arranged so that the fiber-shaped filler can naturally slides on a sieve. These sieves are preferably cylindrical sieves in which the side is composed of the net. An aspect of putting the fiber-shaped filler in the cylindrical sieve and then rotating the sieve is preferred since an effective area of the net increases.

The method-2 is a method including the processes of (2-1) dispersing a fiber-shaped filler with stirring in a solvent such as water, acetone, alcohol or ether, (2-2) allowing the dispersion to be left to stand thereby naturally sedimenting the fiber-shaped filler, (2-3) removing the solvent to obtain a laminate of the fiber-shaped filler in which a fiber length continuously varies along a layer and the lower layer has a longer fiber length, and (2-4) appropriately dividing the laminate into some layers, and measuring a fiber length of the fiber-shaped filler of each layer using the above method thereby determining the content of a fiber having a fiber length of more than 200 μm. The fiber-shaped filler according to the present invention can be obtained by appropriately removing a fiber-shaped filler of the lower layer of this laminate. Examples of the method of removing the solvent in the process (2-3) include a method of sucking up the solvent by an appliance such as a pipette. Dispersion in the process (2-1) is preferably performed by a container including a filtering device so as to simply remove the solvent.

The content of the fiber-shaped filler in the resin composition of the present invention is preferably from 5 to 250 parts by mass based on 100 parts by mass of the liquid crystal polyester. When the content is more than 250 parts by mass, moldability of the resin composition is likely to deteriorate and thus the mechanical strength may also decrease, resulting in brittle resin composition. When the content is less than 5 parts by mass, (1) dimensional stability of a molding made of a resin composition may deteriorate and thus a molding having desired dimension is less likely to be obtained, (2) anisotropy of a liquid crystal polyester in a resin composition is strongly exhibited, and thus a unfavorable phenomenon such as warp may occur in a molding, and (3) the effect of improving the mechanical strength by a fiber-shaped filler may deteriorate.

Taking a balance between the above-mentioned characteristics into consideration, the content of the fiber-shaped filler in the resin composition of the present invention is more preferably from 10 to 150 parts by mass, still more preferably from 25 to 100 parts by mass, and particularly preferably from 40 to 70 parts by mass, based on 100 parts by mass of the liquid crystal polyester.

The resin composition of the present invention may contain one or more kinds of other components such as additives, and resins other than the liquid crystal polyester.

Examples of the additive include an antioxidant, a heat stabilizer, an ultraviolet absorber, an antistatic agent, a surfactant, a flame retardant, a colorant, a leveling agent, a defoamer and a plate-shaped filler. The content of the additive in the liquid crystal polyester composition is preferably from 0 to 5 parts by mass based on 100 parts by mass of the liquid crystal polymer.

Examples of the resin other than the liquid crystal polyester include thermoplastic resins such as polypropylene, polyamide, polyester other than a liquid crystal polyester, polysulfone, polyphenylene sulfide, polyetherketone, polycarbonate, polyethersulfone, polyphenylene ether and polyetherimide; and thermosetting resins such as a phenol resin, an epoxy resin, a polyimide resin and a cyanate resin. The content of the resin other than the liquid crystal polyester in the liquid crystal polyester composition is preferably from 0 to 99 parts by mass based on 100 parts by mass of the liquid crystal polyester.

The resin composition of the present invention is preferably prepared by melt-kneading a liquid crystal polyester, a fiber-shaped filler and optionally usable other components using an extruder, and then extruding the melt-kneaded mixture into pellets. An extruder including a cylinder, one or more screws disposed in the cylinder, and one or more supply ports with which the cylinder is provided is preferable, and an extruder further including one or more vent portions with which the cylinder is provided is more preferable.

In order to obtain a molding from the resin composition of the present invention, it is preferred that a liquid crystal polyester and a fiber-shaped filler are melt-kneaded in advance to prepare a pellet-shaped resin composition (hereinafter referred to as "resin composition pellets"). In case of using other components such as additives, a liquid crystal polyester, a fiber-shaped filler and other components may be mixed and melt-kneaded to prepare resin composition pellets.

Although the resin composition pellets can be produced by various commonly used methods, it is preferred that the fiber length is not remarkably shortened by cutting the fiber-shaped filler. Examples of the method for producing resin composition pellets include (1) a method in which a liquid crystal polyester is heat-melted by an extruder and then a fiber-shaped filler and other components are charged in the extruder, and the mixture is melt-kneaded and pelletized, and (2) a method in which a liquid crystal polyester, a fiber-shaped filler and other components are mixed using a mixer such as a Henschel mixer or a tumbler, and then the mixture is melt-kneaded and pelletized by an extruder. In order to prevent the fiber length of the fiber-shaped filler from remarkably shortening by cutting, it is necessary to optimize a melt-kneading temperature and a shear force in the above-mentioned methods (1) and (2), and a mixing temperature in the above-mentioned method (2).

The melt-kneading temperature in the above-mentioned methods (1) and (2) is preferably from [FT+10]° C. to [FT+80]° C., in which FT (° C.) is a flow initiation temperature of a liquid crystal polyester. The shear force, particularly a shear force according to the extruder, is optimized based on the kind and scale of the extruder. From the viewpoint of the prevention of remarkable shortening of the fiber length, and satisfactory operability, preferable extruder is a twin-screw extruder. The mixing temperature in the above-mentioned method (2) is from 0° C. to FT (° C.). When the temperature is higher than FT (° C.), a fiber-shaped filler and other components are less likely to be mixed uniformly in the obtained resin composition pellets, and thus obtaining resin composition pellets in which the fiber-shaped filler and other components are unevenly distributed. Practical temperature is from about 20 to 200° C. The mixing time is usually from about 0.001 to 5 hours, and preferably from 0.01 to 3 hours. It is possible to easily handle resin composition pellets obtained under the conditions of the above-mentioned temperature and time in molding such as injection molding.

The molding method of obtaining a molding using the resin composition of the present invention is preferably a melt molding method. Examples of the melt molding method include an extrusion molding method such as an injection molding method, a T-die method or an inflation method; a compression molding method; a blow molding method; a vacuum molding method; and a press molding method. Among these methods, an injection molding method is preferable, and an injection molding method using resin composition pellets is particularly preferable.

The injection molding method suited to sufficiently reduce the generation amount of particles is a method in which resin composition pellets are melted at a temperature from [FT+30]° C. to [FT+80]° C., in which FT (° C.) is a flow initiation temperature of resin composition pellets, and then the melt is molded by injected into a mold set to a temperature of 80° C. or higher. The flow initiation temperature of resin composition pellets means a temperature at which resin composition pellets are melted in a plasticizing device of an injection molding machine, and is usually a flow initiation temperature of a liquid crystal polyester. The resin composition pellets to be used for injection molding are preferable dried in advance.

When injection molding is performed at a temperature lower than [FT+30]° C., surface strength of the obtained molding decreases, and thus the generation of particles may be promoted and fluidity of resin composition pellets may drastically deteriorate, unpreferably. When injection molding is performed at a temperature higher than [FT+80]° C., (1) a liquid crystal polyester is decomposed in a molding machine and, as a result, the obtained molding is likely to cause degassing or the like and thus it may become difficult to use the molding in applications such as electric and electronic parts, and optical parts, and (2) there is likely to exert such an evil influence that a molten resin flows out of a nozzle in case of removing a molding from a mold after injection molding, and thus causing a problem such as deterioration of productivity of the molding, unpreferably. From the viewpoint of stability and moldability of the molding, resin composition pellets are preferably melted at a temperature within a range from [FT+30]° C. to [FT+60]° C.

When the mold temperature is lower than 80° C., surface smoothness of the obtained molding is impaired and thus the generation amount of particles may be promoted. From the viewpoint of reducing the generation amount of particles, the higher a mold temperature becomes, the more advantageous. When the mold temperature is too high, there may arise the following problems, unpreferably: (1) since the cooling effect of the molding by the mold deteriorates, the time required to the cooling step may be prolonged, resulting in deterioration of productivity, (2) since mold releasability deteriorates, the molding may undergo deformation, and (3) since mutual engagement of molds becomes worse, the molding may be likely to be broken at the time of opening and closing of the mold. It is preferred that the upper limit of the mold temperature is appropriately optimized according to the kind of resin composition pellets so as to prevent a liquid crystal polyester contained in resin composition pellets from decomposing.

As described above, it is possible to obtain a molding in which the generation amount of particles is sufficiently reduced, by injection molding of pellets of the resin composition of the present invention. The molding can be suitably used as parts of electric and electronic instruments, and optical instruments.

The molding obtained from the resin composition of the present invention preferably includes a planar portion in which "magnitude of an increase in surface roughness (Ra)" obtained by the following surface tape peeling test method is 0.4 μm or less, so as to sufficiently reduce the generation amount of particles in case of producing a molding and the generation amount of particles due to deterioration of a molding with a lapse of time.

A surface tape peeling test method includes the following processes of:
(1) measuring initial surface roughness (Ra1) of a plane of a molding in accordance with the measurement of center line average roughness defined in JIS B0601-1994;
(2) affixing a tape with an adhesive strength of 4.0 N/mm on the plane;
(3) removing the tape;
(4) repeating the processes (2) and (3) 30 times with respect to the same plane (details of a peeling test of the processes (2) and (3) are disclosed in JP-A-2008-239950);
(5) measuring surface roughness (Ra2) of the plane in accordance with the same method as in the process (1); and
(6) determining a difference between Ra2 and Ra1 (Ra2−Ra1) as "magnitude of an increase in surface roughness (Ra)".

From the viewpoint of sufficiently reducing the generation amount of particles, the lower "magnitude of an increase in surface roughness (Ra)" of the molding obtained from the resin composition of the present invention, the better. The magnitude of an increase in surface roughness is preferably 0.4 μm or less, more preferably 0.3 μm, and still more preferably 0.2 μm or less.

Heretofore, the degree of the generation of particles caused by deterioration of the molding with a lapse of time could not have been determined, unless a long-period durability test of the molding is carried out. To the contrary, according to the above-mentioned surface tape peeling test method, it is possible to optimize the molding conditions of the molding without carrying out the long-period durability test. Therefore, the surface tape peeling test method is remarkably useful from the viewpoint of stably producing the molding.

The molding conditions of molding can be determined by a preliminary test using a mold in which a flat plate-shaped molding (standard molding) having a shape of 64 mm (length)×64 mm (width)×1 mm (thickness) is obtained. When molding is performed under such molding conditions, the molding obtained by using a mold having a desired shape has "magnitude of an increase in surface roughness (Ra)" equivalent to that of the standard molding. It is possible to easily obtain a molding, in which the generation amount of particles in case of producing a molding and the generation amount of particles due to deterioration of a molding with a lapse of time are sufficiently reduced, from the resin composition of the present invention based on such a preliminary test.

Examples of the molding to be obtained by using the resin composition of the present invention include electric and electronic parts, and optical parts such as a connector, a socket, relay parts, a coil bobbin, an optical pickup, an oscillator, a printed wiring board, a circuit substrate, a semiconductor package, computer related parts, a camera lens-barrel, an optical sensor casing, a compact camera module casing (package and lens-barrel), projector optical engine components, and semiconductor related parts such as an IC tray and a wafer carrier; home electric appliances such as VCR, a television, an iron, an air-conditioner, a stereo, a cleaner, a refrigerator, a rice cooker, and illumination instruments; illumination instruments parts such as a lamp reflector and a lamp holder; acoustic goods such as a compact disc, a laser disc, and a speaker; communication apparatuses such as a ferrule for optical cables, telephone parts, facsimile parts, and a modem.

Examples of the molding other than the above molding include copying machine and printing press-related parts such as a stripping finger and a heater holder; machine parts such as an impeller, a fan gear, gear, a bearing, motor parts, and a case; automobile parts, such as a mechanical component for cars, engine parts, parts in engine room, parts for electronics, and interior parts; cooking appliances such as a pan for microwave cooking and heat-resistant tableware; building materials and/or construction materials such as a heat-insulation material or sound-insulation material such as a floor material and a wall material, a supporting material such as a beam and a pillar and a roof material; airplane, space machine, and parts for space machinery; and parts for radiation facility, such as a nuclear reactor, parts for marine facility, jigs for cleaning, optical instrument parts, bulbs, pipes, nozzles, filters, films, medical application instrument parts and medical application material, sensors parts, sanitary goods, sporting goods, and leisure goods.

According to the present invention, it is possible to provide a liquid crystal polyester resin composition capable of producing a molding in which the generation amount of particles is sufficiently reduced, and is also excellent in mechanical strength, heat resistance and moldability.

EXAMPLES

The present invention will be described below by way of Examples, but the present invention is not limited to these Examples. The measured values in Examples and Comparative Example were determined according to the following methods.

1. Bending Strength, Bending Elastic Modulus

A three-point bending strength and a bending elastic modulus of test pieces of 127 mm in length, 12.7 mm in width and 6.4 mm in thickness obtained by molding using an injection molding machine Model PS40E-5ASE manufactured by Nissei Resin Industry Co. were measured under the measurement conditions in accordance with ASTM D790, using Tensilon UTM-500 manufactured by A&D Company, Limited.

2. Deflection Temperature Under Load

A deflection temperature under load of the same test pieces described above was measured under the measurement conditions in accordance with ASTM D648, using a No. 148 HD-PC HEAT DISTORTION TESTER manufactured by Yasuda Seiki Seisakusho LTD.

3. Tensile Strength, Tensile Elongation

A tensile strength and an elongation of No. 4 dumbbell-shaped test pieces obtained by molding using an injection molding machine Model PS40E-5ASE manufactured by manufactured by Nissei Resin Industry Co. were measured by the method in accordance with ASTM D790, using Autograph AG-5000D manufactured by Shimadzu Corporation.

4. Molding Shrinkage Ratio

Using an injection molding machine Model PS40E-5ASE manufactured by Nissei Resin Industry Co. and a mold having a dimension of 64 mm (length)×64 mm (width)×3 mm (thickness), a dimension of test pieces obtained by molding using a film gate was measured by a micrometer. Then, each shrinkage ratio of a dimension of the test piece in a mold flow direction (MD) and a dimension of the test piece in a tangential direction of flow (TD) was calculated based on the dimension of the mold.

5. Method (1) for Measurement of Amount of Particles

The method (1) for the measurement of the amount of particles includes the following processes of:
(1) molding a raw material using an injection molding machine Model PS40E-5ASE manufactured by Nissei Resin Industry Co. to obtain a molding of 25.60 mmϕ in outer diameter, 20.00 mmϕ in inner diameter and 19.85 mm in length, including a spool portion, a runner portion and a cylindrical molding;
(2) melting a cutting portion between the runner portion and the cylindrical molding thereby performing sealing;
(3) immersing the sealed cylindrical molding in 50 mL of pure water and cleaning a surface while gently stirring for 1 minute;
(4) stopping stirring and allowing the molding to be left to stand for 10 minutes;
(5) measuring the number of particles of 2 μm to 100 μm in size dispersed in 10 mL of a wash, using a liquid-borne particle counter system (including a syringe sampler KZ-30W1 (for collection of a particle dispersion), a particle sensor KS-65, and a controller KL-11A)) manufactured by RION Co., Ltd.;
(6) determining the number of particles dispersed in 1 mL of a wash from the measurement results of the process (5);
(7) further performing the processes (5) and (6) of the wash obtained in the process (4) four times to obtain five data in total with respect to the number of particles; and
(8) adopting an average of five data as the amount of particles.

6. Method (2) for Measurement of Amount of Particles

The method (2) for the measurement of the amount of particles includes the following processes of:
(1) molding a raw material using an injection molding machine Model PS40E-SASE manufactured by Nissei Resin Industry Co. to obtain a flat plate-shaped test piece of 64 mm (length)×64 mm (width)×1 mm (thickness);
(2) allowing the test piece to be suspended in a 500 mL beaker containing 500 mL of ultrapure water therein (a gate portion of the test piece is not brought into contact with ultrapure water);

(3) cleaning the test piece suspended in the beaker through irradiation with ultrasonic wave (36 Hz) for 60 seconds, and using an aqueous solution in the beaker as test water; and
(4) performing the processes in the same manner as in the processes (5) to (8) of the above "method (1) for measurement of the amount of particles" with respect to the test water, and adopting an average of five data as the amount of particles.

Parts of electric and electronic instruments, and parts of optical instruments are usually cleaned by a vibration type (ultrasonic) cleaner, and it is confirmed that particles are generated from a surface of the parts by this cleaning operation.

Production Example 1

Production of Liquid Crystal Polyester

In a reactor equipped with a stirrer, a torque meter, a nitrogen gas introducing tube, a thermometer and a reflux condenser, 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, 1347.6 g (13.2 mol) of acetic anhydride and 0.194 g of 1-methylimidazole were charged. Under a nitrogen gas flow, a temperature was raised from room temperature to 145° C. over 15 minutes while stirring, and then the mixture was refluxed at 145° C. for 1 hour. Then, 0.194 g of 1-methylimidazole was added and the temperature was raised from 145° C. to 320° C. over 3 hours while distilling off the by-produced acetic acid and the unreacted acetic anhydride. After maintaining at 320° C. for 2 hours, contents were taken out from the reactor and then cooled to room temperature. The obtained solid substance was ground by a grinder to obtain a powdered prepolymer. A flow initiation temperature of this prepolymer was measured by a flow tester Model CFT-500 manufactured by Shimadzu Corporation. As a result, it was 261° C.

The prepolymer was subjected to solid phase polymerization by raising the temperature from room temperature to 250° C. over 1 hour under a nitrogen gas atmosphere, and raising the temperature from 250° C. to 285° C. over 5 hours and maintaining at 285° C. for 3 hours, followed by cooling to obtain a powdered liquid crystal polyester having a flow initiation temperature of 327° C.

Example 1

The liquid crystal polyester in the amount of 100 parts by mass, obtained in Production Example 1, was melt-kneaded with 67 parts by mass of a fiber-shaped filler (1) in which the content of a fiber having a fiber diameter of 10 μm, a number average fiber length of 109 μm and a fiber length of more than 200 μm is 6.3% by mass, obtained by sieving (classifying) a glass fiber EFH75-01 manufactured by Central Glass Co., Ltd. at a cylinder temperature of 340° C. using a twin screw extruder PCM-30 manufactured by Ikegai Iron Works, Ltd. to obtain pellets of a liquid crystal polyester resin composition.

The pellets were dried and then molded by an injection molding machine Model PS40E-5ASE manufactured by Nissei Resin Industry Co. to obtain test pieces of 127 mm in length, 12.7 mm in width and 6.4 mm in thickness. Each test piece showed a tensile strength of 130 MPa, an elongation of 8.4%, a bending strength of 118 MPa, an elastic modulus of 10,800 MPa, a deflection temperature under load of 277° C., and a molding shrinkage ratio of 0.24% (MD) and 1.22% (TD). Separately, the amount of particles of the dried pellets was measured by the measuring methods (1) and (2). The results are shown in Tables 1 and 2.

The above-mentioned fiber diameter and number average fiber length were measured by the method including the following processes of: (1) weighing 1.0 g of pellets in a crucible, (2) ashing the pellets through a treatment in an electric furnace at 600° C. for 4 hours, (3) dispersing an incinerated substance in methanol, (4) spreading the dispersion on a slide glass, and taking micrographs, (5) directly reading a fiber diameter and a fiber length of a fiber-shaped filler from the micrographs, and (6) calculating an average from the read values using a parameter of 400.

For the measuring method (1), when the count number of particles is less than 100 particles/mL, the amount of particles in Table 2 was rated as "Good (within a permissible range)", whereas, when the count number of particles is 100 particles/mL or more, the amount of particles was rated as "Poor (not within a permissible range)". For the measuring method (2), the amount of particles was indicated by the number of particles (count number) corresponding to each particle diameter (μm).

Example 2

In the same manner as in Example 1, except that the fiber-shaped filler (1) was changed to a fiber-shaped filler (2) in which the content of a fiber having a fiber diameter of 10 μm, a number average fiber length of 106 μm and a fiber length of more than 200 μm is 7.3% by mass, obtained by sieving (classifying) a glass fiber EFH75-01 manufactured by Central Glass Co., Ltd., pellets were obtained. The results are shown in Tables 1 and 2.

Example 3

In the same manner as in Example 1, except that the fiber-shaped filler (1) was changed to a fiber-shaped filler (3) in which the content of a fiber having a fiber diameter of 10 μm, a number average fiber length of 100 μm and a fiber length of more than 200 μm is 5.1% by mass, obtained by sieving (classifying) a glass fiber EFH75-01 manufactured by Central Glass Co., Ltd., pellets were obtained. The results are shown in Tables 1 and 2.

Comparative Example 1

In the same manner as in Example 1, except that the fiber-shaped filler (1) was changed to a glass fiber EFH75-01 manufactured by Central Glass Co., Ltd. in which the content of a fiber having a fiber diameter of 10 μm, a number average fiber length of 114 μm and a fiber length of more than 200 μm is 10.6% by mass, pellets were obtained. The results are shown in Tables 1 and 2.

TABLE 1

|  | Examples | | | Comparative |
| --- | --- | --- | --- | --- |
|  | 1 | 2 | 3 | Example 1 |
| Components of resin composition | | | | |
| 1. Liquid crystal polyester (parts by mass) | 100 | 100 | 100 | 100 |
| 2. Fiber-shaped filler (parts by mass) (Note) | | | | |
| Fiber-shaped filler (1) | 67 | | | |
| Fiber-shaped filler (2) | | 67 | | |
| Fiber-shaped filler (3) | | | 67 | |
| EFH75-01 | | | | 67 |

TABLE 1-continued

| Physical properties | | | | |
|---|---|---|---|---|
| Tensile strength (MPa) | 130 | 127 | 125 | 129 |
| Elongation (%) | 8.4 | 8.2 | 8.5 | 7.9 |
| Bending strength (MPa) | 118 | 114 | 114 | 115 |
| Elastic modulus (MPa) | 10,800 | 10,400 | 10,800 | 10,700 |
| Deflection temperature under load (° C.) | 277 | 277 | 271 | 278 |
| Molding shrinkage ratio (%) | | | | |
| MD | 0.24 | 0.24 | 0.27 | 0.24 |
| TD | 1.22 | 1.24 | 1.24 | 1.18 |

Note:
Characteristics of each fiber-shaped filler are shown in the following table.

| | Fiber-shaped filler | | | |
|---|---|---|---|---|
| | (1) | (2) | (3) | EFH75-01 |
| Fiber diameter (μm) | 10 | 10 | 10 | 10 |
| Number average fiber length (μm) | 109 | 106 | 100 | 114 |
| Proportion of fibers having fiber length of more than 200 μm (% by mass) | 6.3 | 7.3 | 5.1 | 10.6 |

TABLE 2

| | Examples | | | Comparative |
|---|---|---|---|---|
| | 1 | 2 | 3 | Example 1 |
| Judgment of amount of particles by measuring method (1) | ○ | ○ | ○ | ○ |
| Amount of particles by measuring method (2) (particles/10 mL) | | | | |
| (1) 2 μm or less | 2,720 | 2,620 | 2,270 | 3,300 |
| (2) more than 2 μm and 2 μm or less | 270 | 310 | 240 | 320 |
| (3) more than 5 μm and 10 μm or less | 26 | 27 | 28 | 31 |
| (4) more than 10 μm and 20 μm or less | 1 | 1 | 1 | 2 |
| (5) more than 20 μm and 50 μm or less | 0 | 0 | 0 | 0 |
| (6) more than 50 μm and 100 μm or less | 0 | 0 | 0 | 0 |

The followings are easily understood from the above results.

1. All of Examples 1 to 3 and Comparative Example 1 show satisfactory tensile strength, elongation, bending strength, elastic modulus, deflection temperature under load (heat resistance) and molding shrinkage ratio (moldability).
2. In all of Examples 1 to 3 and Comparative Example 1, the amount of particles by the measuring method (1) is within a permissible range.
3. Examples 1 to 3 are smaller in the amount of particles by the measuring method (2) as compared to Comparative Example 1.

Accordingly, it is apparent that, according to the present invention, it is possible to obtain a liquid crystal polyester resin composition capable of producing a molding in which the generation amount of particles is sufficiently reduced, and is also excellent in mechanical strength (tensile strength, elongation, bending strength, elastic modulus), heat resistance and moldability.

The resin composition of the present invention can be used in various moldings such as electric and electronic parts, optical parts, semiconductor manufacturing process-related parts, home electric appliance parts, illumination instrument parts, acoustic goods, communication apparatus parts, printing press-related parts, automobile parts, cooking appliance parts, building materials and/or construction materials, parts for space machinery, medical application instrument parts, sporting goods and leisure goods.

What is claimed is:

1. A liquid crystal polyester resin composition comprising:
    (1) a liquid crystal polyester, and
    (2) a fiber-shaped filler having a fiber diameter of 5 to 15 μm and a number average fiber length of 30 to 200 μm, wherein the content of a fiber having a fiber length of more than 200 μm is 10% by mass or less based on 100% by mass of the amount of the fiber-shaped filler.

2. The liquid crystal polyester resin composition according to claim 1, wherein the liquid crystal polyester is a liquid crystal polyester including repeating units represented by the following general formulas (1), (2) and (3):

$$—O—Ar^1—CO—, \quad (1)$$

$$—CO—Ar^2—CO—, \quad (2)$$

$$—X—Ar^3—Y—, \text{ and} \quad (3)$$

$$—Ar^4—Z—Ar^5— \quad (4)$$

wherein $Ar^1$ is a phenylene group, a naphthylene group or a biphenylylene group; $Ar^2$ and $Ar^3$ each independently represents a phenylene group, a naphthylene group, a biphenylylene group, or a group represented by the general formula (4); X and Y each independently represents an oxygen atom or an imino group; $Ar^4$ and $Ar^5$ each independently represents a phenylene group or a naphthylene group; Z is an oxygen atom, a sulfur atom, a carbonyl group, a sulfonyl group or an alkylidene group; hydrogen atoms in $Ar^1$, $Ar^2$ or $Ar^3$ each independently may be substituted with a halogen atom, an alkyl group or an aryl group.

3. The liquid crystal polyester resin composition according to claim 2, wherein the liquid crystal polyester is a liquid crystal polyester including a repeating unit represented by the general formula (1) in the amount of 30 to 80 units, a repeating unit represented by the general formula (2) in the amount of 10 to 35 units and a repeating unit represented by the general formula (3) in the amount of 10 to 35 units, based on 100 units in total of repeating units represented by the general formulas (1), (2) and (3).

4. The liquid crystal polyester resin composition according to claim 2, wherein X and Y in the general formula (3) are oxygen atoms.

* * * * *